US 6,587,295 B1

(12) United States Patent
Kiyono et al.

(10) Patent No.: US 6,587,295 B1
(45) Date of Patent: Jul. 1, 2003

(54) METHOD, APPARATUS, SYSTEM AND COMPUTER PROCESS FOR IMPROVING PROPERTY OF THIN-FILM MAGNETIC HEAD

(75) Inventors: Hiroshi Kiyono, Tokyo (JP); Nobutaka Nishio, Tokyo (JP)

(73) Assignee: TDK Corporation, Tokyo (JP)

( * ) Notice: Subject to any disclaimer, the term of this patent is extended or adjusted under 35 U.S.C. 154(b) by 352 days.

(21) Appl. No.: 09/694,984

(22) Filed: Oct. 25, 2000

(30) Foreign Application Priority Data

Dec. 13, 1999 (JP) ............................................ 11-352538

(51) Int. Cl.$^7$ ................................................ G11B 5/09
(52) U.S. Cl. ...................................... 360/53; 360/46
(58) Field of Search .............................. 360/46, 53, 31, 360/66, 68, 75, 25

(56) References Cited

U.S. PATENT DOCUMENTS

| | | | | |
|---|---|---|---|---|
| 4,864,435 A | * | 9/1989 | Kawakami et al. ............ | 360/66 |
| 4,970,621 A | * | 11/1990 | Gailbreath et al. ......... | 361/149 |
| 5,236,735 A | * | 8/1993 | Yoshida et al. ............... | 427/96 |
| 5,337,200 A | * | 8/1994 | Watanabe ..................... | 360/66 |
| 5,392,169 A | * | 2/1995 | Argyle et al. ................. | 360/45 |
| 5,559,653 A | * | 9/1996 | Shouji et al. ................ | 360/126 |
| 6,014,282 A | * | 1/2000 | Ito ............................... | 360/75 |
| 6,118,607 A | * | 9/2000 | Jung ............................ | 360/53 |
| 6,297,925 B1 | * | 10/2001 | Lee .............................. | 360/75 |
| 6,301,068 B1 | * | 10/2001 | Ionescu ....................... | 360/68 |

FOREIGN PATENT DOCUMENTS

| | | | | |
|---|---|---|---|---|
| EP | 0541943 A2 | * | 9/1992 | ............ G11B/5/31 |
| JP | 64082301 A | * | 3/1989 | ............ G11B/5/02 |
| JP | 04228103 A | * | 8/1992 | ............ G11B/5/09 |
| JP | 04286701 A | * | 10/1992 | ............ G11B/5/09 |
| JP | 05081604 A | * | 4/1993 | ............ G11B/5/02 |
| JP | 05151521 A | * | 6/1993 | ............ G11B/5/17 |
| JP | 05159227 A | * | 6/1993 | ............ G11B/5/31 |
| JP | 08194903 A | * | 7/1996 | ............ G11B/5/09 |
| JP | A 11-328603 | | 11/1999 | |
| JP | 2001176006 A | * | 6/2001 | ............ G11B/5/02 |

* cited by examiner

Primary Examiner—David Hudspeth
Assistant Examiner—Dan Davidson
(74) Attorney, Agent, or Firm—Oliff & Berridge, PLC

(57) ABSTRACT

A property improving method includes first and second steps. In the first step popcorn noise in a read signal of a thin-film magnetic head is measured so as to determine whether the popcorn noise falls within a permissible range. In the second step a current is fed to the recording head of the thin-film magnetic head, the current having a value greater than that of the current fed when a normal writing operation is performed. While the value of the current fed to the recording head is gradually increased in the second step, the first and second steps are alternately repeated until it is determined that the popcorn noise falls within a permissible range in the first step, or the current value reaches a specific upper limit.

9 Claims, 12 Drawing Sheets

METHOD, APPARATUS, SYSTEM AND COMPUTER PROCESS FOR IMPROVING PROPERTY OF THIN-FILM MAGNETIC HEAD

BACKGROUND OF THE INVENTION

1. Field of the Invention

The present invention relates to a method, an apparatus, a system, a computer process, and a recording medium on which a program is stored for improving a property of a thin-film magnetic head incorporating at least an induction-type electromagnetic transducer.

2. Description of the Related Art

Performance improvements in thin-film magnetic heads have been sought as areal recording density of hard disk drives has increased. Consequently, in place of thin-film magnetic heads that perform reading and writing by an induction-type electromagnetic transducer, composite thin-film magnetic heads have been widely used. A composite head is made of a layered structure including a recording head having an induction-type electromagnetic transducer for writing and a reproducing head having a magnetoresistive (MR) element for reading.

With regard to a thin-film magnetic head having an induction-type electromagnetic transducer, it is known that so-called popcorn noise may occur in a read signal when reading is performed after writing is performed. The popcorn noise is pulse-shaped noise having a peak value much higher than that of normal white noise. The popcorn noise causes problems such as a reduction in accuracy of alignment of the thin-film magnetic head. While the definite cause of popcorn noise is not clear, it is assumed to be caused by a delay in change when the magnetic domain of a magnetic layer of the induction-type electromagnetic transducer shifts from the state of writing operation to the stationary state.

To reduce the popcorn noise, measures have been taken in prior art with regard to the design of the thin-film magnetic head and the manufacturing process, such as optimization of the geometry and the composition of the magnetic layers of the induction-type electromagnetic transducer.

However, such measures are not enough to eliminate the popcorn noise completely, due to problems such as a shift in composition and variations in composition in a wafer.

Another problem of the prior-art measures is that a complete product with high added values, such as a thin-film magnetic head attached to a suspension, an extension line and terminals being connected to the head, may be found faulty due to popcorn noise. Such faulty products must be discarded, and a great loss thereby results.

In Published Unexamined Japanese Patent Application Hei 11-328603 (1999), a technique is disclosed for removing Barkhausen noise resulting from the domain wall shift of the MR film of the reproducing head by feeding a current to the recording head. However, the above-mentioned popcorn noise is not considered in this technique.

Although the above-mentioned publication does not disclose the magnitude of the current fed to the recording head to remove Barkhausen noise, the magnitude of the current is assumed to be the same as the current fed during a normal writing operation, since the current is fed to the recording head through driving the read/write circuitry. However, as will be disclosed in the detailed description of the preferred embodiment of the invention, it is almost impossible to reduce the popcorn noise only by feeding a current to the recording head, the current being nearly as large as the current fed during a normal writing operation.

The above publication states that it is preferred to remove Barkhausen noise by feeding a current to the recording head after an occurrence of reading error. In an embodiment described in this publication Barkhausen noise is removed after an occurrence of reading error. However, such processing is not capable of improving the property of the thin-film magnetic head fundamentally.

OBJECT AND SUMMARY OF THE INVENTION

It is an object of the invention to provide a method, an apparatus, a system, a computer process, and a recording medium on which a program is stored, each of which is provided for reducing noise made in a read signal of a thin-film magnetic head after a writing operation is completed, and for reducing nonconforming products.

A first method of the invention is provided for improving a property of a thin-film magnetic head by reducing noise made in a read signal after a writing operation is completed, the head incorporating at least an induction-type electromagnetic transducer and performing reading and writing. A current is fed to the transducer, the current having a value greater than a value of a current fed when a normal writing operation is performed.

According to the first method of the invention, a current is fed to the electromagnetic transducer, the current having a value greater than the value of the current fed when a normal writing operation is performed. As a result, the temperature of the transducer increases, and the noise made in the read signal after the writing operation is completed is thereby reduced.

According to the first method of the invention, the current may be fed while the head is not facing toward a recording medium.

A second method of the invention is provided for improving a property of a thin-film magnetic head by reducing noise made in a read signal after a writing operation is completed, the head incorporating at least an induction-type electromagnetic transducer and performing reading and writing. The method includes: a first step of measuring the noise in the read signal of the head and determining whether the noise falls within a permissible range; and a second step of feeding a current to the transducer, the current having a value greater than a value of a current fed when a normal writing operation is performed. While the value of the current fed to the transducer is gradually increased in the second step, the first and second steps are alternately repeated until it is determined that the noise falls within the permissible range in the first step, or the current value reaches a specific upper limit.

According to the second method of the invention, a current is fed to the electromagnetic transducer of the thin-film magnetic head producing noise beyond the permissible range, the current having a value greater than the value of the current fed when the normal writing operation is performed, until it is determined that the noise falls within the permissible range, or the current value reaches a specific upper limit. As a result, noise of many of thin-film magnetic heads manufactured falls within the permissible range.

According to the second method of the invention, the second step may be performed while the head is not facing toward a recording medium.

According to the second method, the first and second steps may be performed when the head is in any of states of a wafer in which a plurality of rows of thin-film magnetic heads are aligned; a row of a plurality of thin-film magnetic heads; the single thin-film magnetic head; the head mounted on a suspension; a plurality of thin-film magnetic heads each of which is mounted on a carriage through a suspension; and the head incorporated in a magnetic disk device.

A first apparatus of the invention is provided for improving a property of a thin-film magnetic head by reducing noise made in a read signal after a writing operation is completed, the head incorporating at least an induction-type electromagnetic transducer and performing reading and writing. The apparatus comprises: a determination means for measuring the noise in the read signal of the head and determining whether the noise falls within a permissible range; an energizing means for feeding a current to the transducer, the current having a value greater than a value of a current fed when a normal writing operation is performed; and a control means for controlling the determination means and the energizing means such that, while the value of the current fed to the transducer is gradually increased, the determination and the energizing are alternately repeated until the determination means determines that the noise falls within the permissible range, or the current value reaches a specific upper limit.

A second apparatus of the invention is provided for improving a property of a thin-film magnetic head by reducing noise made in a read signal after a writing operation is completed, the head incorporating at least an induction-type electromagnetic transducer and performing reading and writing. The apparatus comprises: a measuring device for measuring the noise in the read signal of the head; an energizing circuit for feeding a current to the transducer, the current having a value greater than a value of a current fed when a normal writing operation is performed; and a control device for determining whether the noise measured by the measuring device falls within a permissible range and for controlling the measuring device and the energizing circuit such that, while the value of the current fed from the energizing circuit to the transducer is gradually increased, the measurement and the energizing are alternately repeated until it is determined that the noise falls within the permissible range, or the current value reaches a specific upper limit.

A system of the invention is provided for improving a property of a thin-film magnetic head by reducing noise made in a read signal after a writing operation is completed, the head incorporating at least an induction-type electromagnetic transducer and performing reading and writing. The system comprises: a processing circuit for performing reading and writing processing of the head and for outputting the read signal; a measuring device for measuring the noise in the read signal outputted from the processing circuit; and a control device for controlling the processing circuit and the measuring device. The processing circuit feeds a current to the transducer in accordance with the control performed by the control device, the current having a value greater than a value of a current fed when a normal writing operation is performed. The control device determines whether the noise measured by the measuring device falls within a permissible range, and controls the measuring device and the processing circuit such that, while the value of the current fed from the processing circuit to the transducer is gradually increased, the measurement and the energizing are alternately repeated until it is determined that the noise falls within the permissible range, or the current value reaches a specific upper limit.

According to the first or second apparatus, or the system of the invention, a current is fed to the electromagnetic transducer of the thin-film magnetic head producing noise beyond the permissible range, the current having a value greater than the value of the current fed when the normal writing operation is performed, until it is determined that the noise falls within the permissible range, or the current value reaches a specific upper limit. As a result, noise of many of thin-film magnetic heads manufactured falls within the permissible range.

A computer process of the invention is provided for improving a property of a thin-film magnetic head by reducing noise made in a read signal after a writing operation is completed, the head incorporating at least an induction-type electromagnetic transducer and performing reading and writing. The process is provided for a system comprising: a processing circuit for performing reading and writing processing of the head and outputting the read signal; a measuring device for measuring the noise in the read signal outputted from the processing circuit; and a computer for controlling the measuring device and the processing circuit.

The process includes the following steps executed by the computer: the first step of determining whether the noise measured by the measuring device falls within a permissible range; and the second step of controlling the processing circuit such that a current is fed to the transducer, the current having a value greater than a value of a current fed when a normal writing operation is performed. While the value of the current fed to the transducer is gradually increased in the second step, the first and second steps are alternately repeated until it is determined that the noise falls within the permissible range in the first step, or the current value reaches a specific upper limit.

According to the computer process of the invention, a current is fed to the electromagnetic transducer of the thin-film magnetic head producing noise beyond the permissible range, the current having a value greater than the value of the current fed when the normal writing operation is performed, until it is determined that the noise falls within the permissible range, or the current value reaches a specific upper limit. As a result, noise of many of thin-film magnetic heads manufactured falls within the permissible range.

A recording medium of the invention retains a program for improving a property of a thin-film magnetic head by reducing noise made in a read signal after a writing operation is completed, the head incorporating at least an induction-type electromagnetic transducer and performing reading and writing. The medium is used in a system comprising: a processing circuit for performing reading and writing processing of the head and outputting the read signal; a measuring device for measuring the noise in the read signal outputted from the processing circuit; and a computer for controlling the measuring device and the processing circuit.

The program includes the following steps executed by the computer: the first step of determining whether the noise measured by the measuring device falls within a permissible range; and the second step of controlling the processing circuit such that a current is fed to the transducer, the current having a value greater than a value of a current fed when a normal writing operation is performed. While the value of the current fed to the transducer is gradually increased in the second step, the first and second steps are alternately repeated until it is determined that the noise falls within the permissible range in the first step, or the current value reaches a specific upper limit.

According to the program stored on the medium of the invention, a current is fed to the electromagnetic transducer of the thin-film magnetic head producing noise beyond the permissible range, the current having a value greater than the value of the current fed when the normal writing operation is performed, until it is determined that the noise falls within the permissible range, or the current value reaches a specific upper limit. As a result, noise of many of thin-film magnetic heads manufactured falls within the permissible range.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings.

Figure 3:
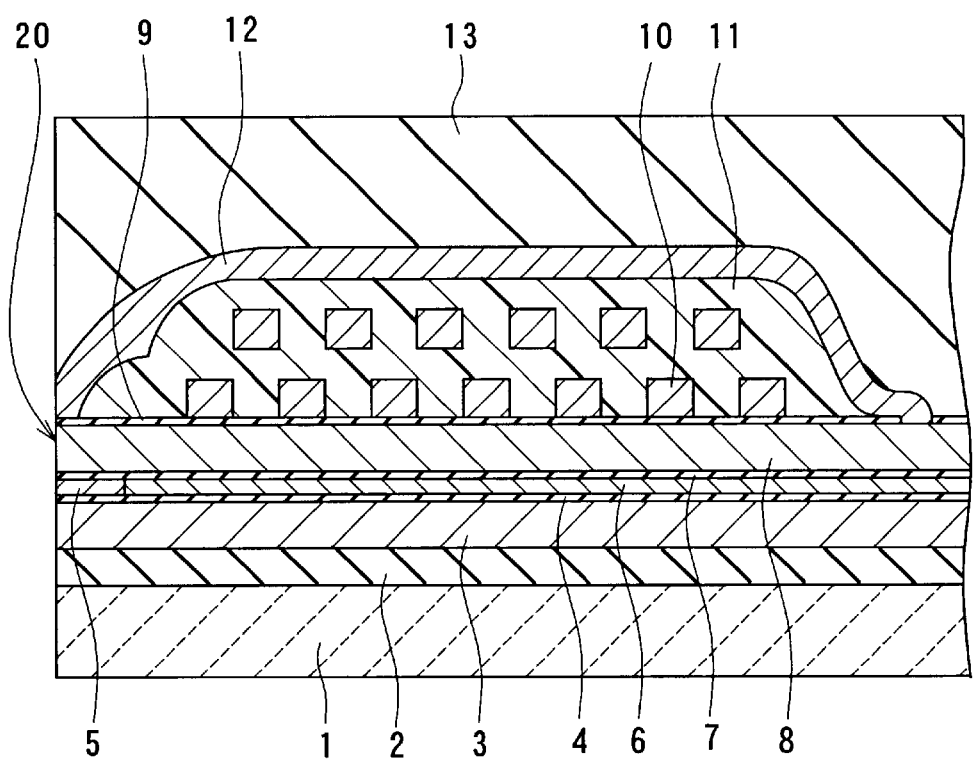
FIG. 3 is a cross section of an example of the configuration of a thin-film magnetic head to which a method and an apparatus for improving the property of the thin-film magnetic head of the embodiment are applied.

Reference is now made to FIG. 3 to describe an example of the configuration of a thin-film magnetic head to which a method and an apparatus for improving a property of the thin-film magnetic head of the embodiment of the invention are applied. FIG. 3 is a cross section orthogonal to the air bearing surface (medium facing surface) of the head.

The thin-film magnetic head of this example comprises: a substrate 1 made of a ceramic material such as aluminum oxide and titanium carbide ($Al_2O_3$—TiC); an insulating layer 2 made of an insulation material such as alumina ($Al_2O_3$) and formed on the substrate 1; a bottom shield layer 3 made of a magnetic material and formed on the insulating layer 2; a bottom shield gap film 4 made of an insulation material such as alumina and formed on the bottom shield layer 3; an MR element 5 for reproduction formed on the bottom shield gap film 4, an end of the MR element 5 being located in the air bearing surface 20. The thin-film magnetic head further comprises: a pair of electrode layers 6 formed on the bottom shield gap film 4 and electrically connected to the MR element 5; a top shield gap film 7 covering the bottom shield gap film 4, the MR element 5 and the electrode layers 6; and a top-shield-layer-cum-bottom-pole-layer (hereinafter called a bottom pole layer) 8 made of a magnetic material and formed on the top shield gap film 7. The MR element 5 may be an element utilizing a magneto-sensitive film that exhibits magnetoresistivity, such as an anisotropic magnetoresistive (AMR) element, a giant magnetoresistive (GMR) element or a tunnel magnetoresistive (TMR) element.

The thin-film magnetic head further comprises a recording gap layer 9 made of an insulation material such as alumina and formed on the bottom pole layer 8; a thin-film coil 10 formed on the recording gap layer 9; an insulating layer 11 made of a thermoset photoresist, for example, and covering the coil 10; a top pole layer 12 made of a magnetic material and formed on the insulating layer 11; and a protection layer 13 made of an insulation material such as alumina and covering the top pole layer 12. Although not shown, a plurality of pad-shaped electrodes are formed on the protection layer 13, the electrodes being connected to the MR element 5 and the thin-film coil 10.

The top pole layer 12 has a pole portion that is a portion located on a side of the air bearing surface 20. The bottom pole layer 8 has a pole portion that is a portion located on a side of the air bearing surface 20. These pole portions are opposed to each other, the recording gap layer 9 being located between the pole portions. The pole portion of the top pole layer 12 has a width equal to the recording track width. An end of the top pole layer 12 located farther from the air bearing surface 20 is connected and magnetically coupled to the bottom pole layer 8 through a contact hole formed in the recording gap layer 9.

The thin-film magnetic head of this example thus fabricated comprises the reproducing head and the recording head including the induction-type electromagnetic transducer. The reproducing head includes the MR element 5 and the bottom shield layer 3 and the top shield layer (bottom pole layer 8) for shielding the MR element 5. Portions of the bottom shield layer 3 and the top shield layer on a side of the air bearing surface 20 are opposed to each other while the MR element 5 is placed between these portions of the bottom shield layer 3 and the top shield layer.

The recording head (induction-type electromagnetic transducer) includes the bottom pole layer 8 and the top pole layer 12 magnetically coupled to each other each of which includes at least one layer. The bottom pole layer 8 and the top pole layer 12 include the pole portions opposed to each other and located in regions on a side of the air bearing surface 20. The recording head further includes: the recording gap layer 9 placed between the pole portion of the bottom pole layer 8 and the pole portion of the top pole layer 12; and the thin-film coil 10 at least a part of which is placed between the bottom pole layer 8 and the top pole layer 12, the at least part of the coil 10 being insulated from the bottom pole layer 8 and the top pole layer 12.

In general, a flying-type thin-film magnetic head used in a magnetic disk device such as a hard disk device is made up of a slider including a thin-film magnetic head element having a configuration as shown in FIG. 3, for example. In general, the slider has a rail a surface of which functions as the air bearing surface, and has a tapered portion or a stepped portion near the air-inflow-side end. The rail slightly floats over a recording medium such as a magnetic disk by means of the airflow admitted from the tapered portion or stepped portion.

Reference is now made to FIG. 4 to FIG. 9 to describe a step-by-step procedure from making a slider out of a wafer to mounting it on a hard disk device.

Figure 4:
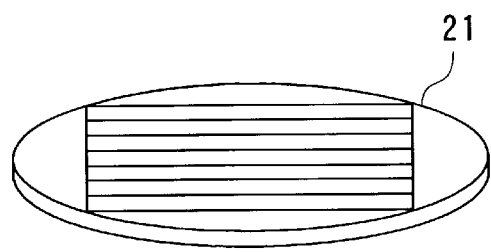
FIG. 4 is a perspective view of a wafer including a plurality of rows of portions to be sliders each of which includes a thin-film magnetic head element.
Figure 5:
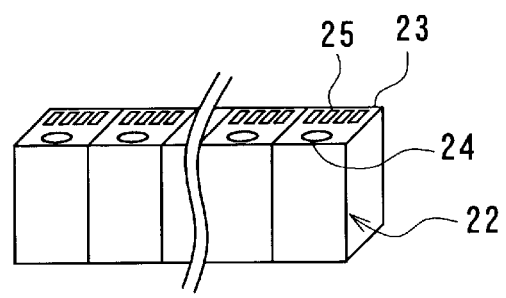
FIG. 5 is a perspective view of a bar made up of a row of slider portions.

FIG. 4 illustrates a wafer 21 including a plurality of rows of portions to be sliders (hereinafter called slider portions) each of which includes a thin-film magnetic head element. The wafer 21 is cut in one direction to form blocks called bars 22, as shown in FIG. 5, each of which includes a row of slider portions 23. In each of the slider portions 23 the thin-film magnetic head element 24 and a plurality of pad-shaped electrodes 25 are formed. The electrodes 25 are connected to an MR element of each of the head elements 24 and to a thin-film coil.

Figure 6:
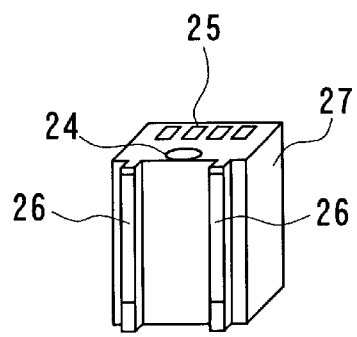
FIG. 6 is a perspective view of a slider.

Next, as shown in FIG. 6, a rail 26 is formed in each of the slider portions 23 of the bar 22. The bar 22 is then separated into individual sliders 27.

Figure 7:
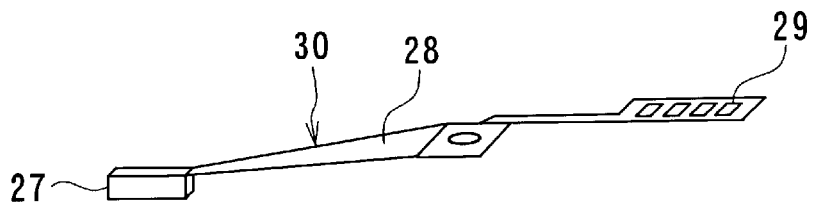
FIG. 7 is a perspective view of a head gimbal assembly.

Next, as shown in FIG. 7, each of the slider 27 is attached to a suspension 28. A signal extension line (not shown) and a terminal 29 are connected to the electrodes 25 of the slider 27. The product in the state shown in FIG. 7 is hereinafter called a head gimbal assembly 30.

Figure 8:
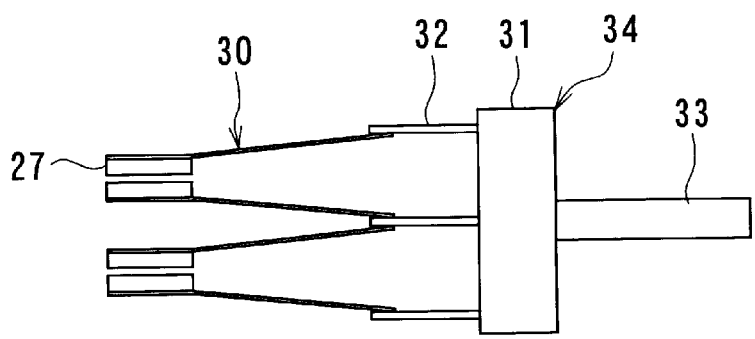
FIG. 8 is a side view of a head stack assembly.

Next, as shown in FIG. 8, a plurality of head gimbal assemblies 30 are mounted on arms 32 of a carriage 31, such that the assemblies 30 are arranged in the vertical direction with spacing between adjacent ones. A voice coil 33 is mounted on the carriage 31 on a side opposite to the arms 32. The product in the state shown in FIG. 8 is hereinafter called a head stack assembly 34.

Figure 9:
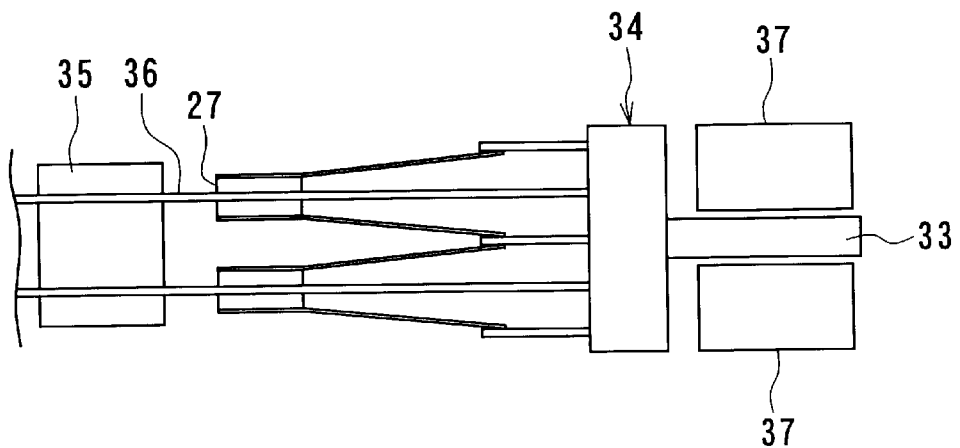
FIG. 9 is a side view of the main part of a hard disk device.

Next, as shown in FIG. 9, the head stack assembly 34 is installed in a hard disk device. The hard disk device includes a plurality of magnetic disks 36 mounted on a spindle motor 35. Two of the sliders 27 are allocated to each of the disks 36, such that the two sliders 27 face each other with each of the disks 36 in between. The hard disk device includes permanent magnets 37 located to face each other, the voice coil 33 of the head stack assembly 34 being placed between the magnets 37.

With regard to a hard disk device, the methods of switching the state of a slider between action and a standstill includes the contact-start-stop (CSS) system and the ramp load method. According to the CSS system, the slider is in contact with a specific region of the magnetic disk when the slider is at a standstill. When the slider is in action, it floats over the disk. According to the ramp load system, the slider retreats from the disk when the slider is at a standstill. When the slider is in action, it approaches the disk.

Figure 10:
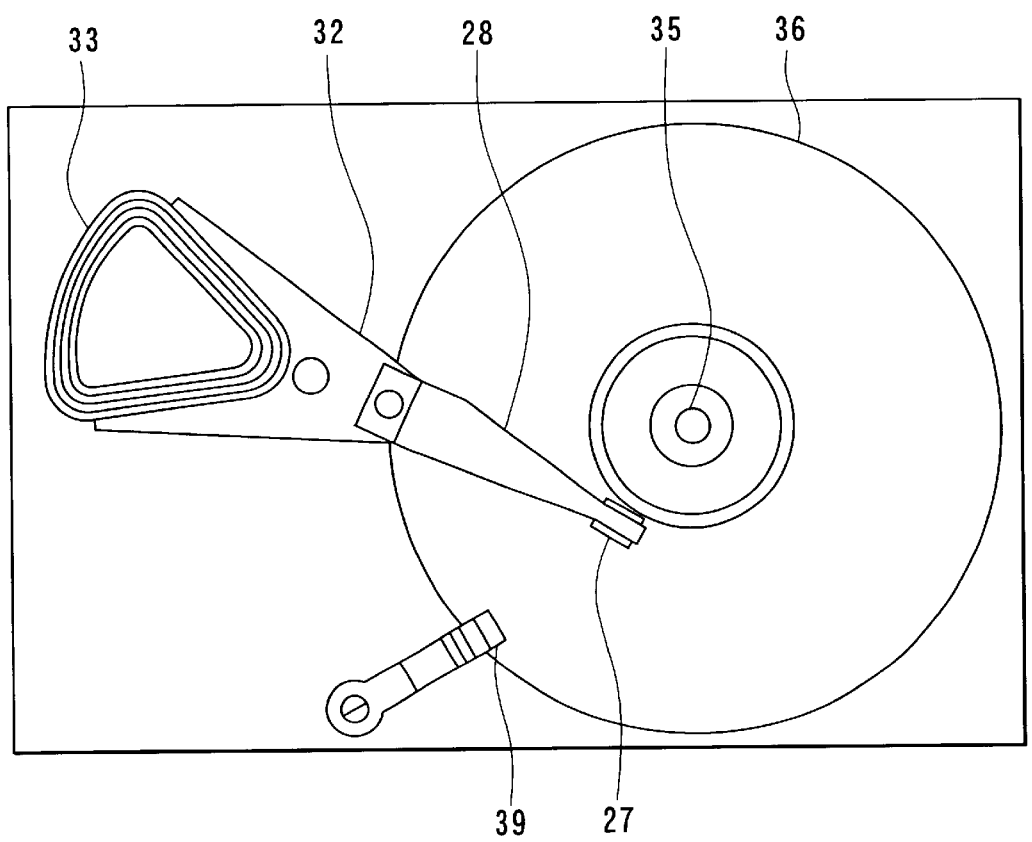
FIG. 10 is a top view of an example of the configuration of a hard disk device of the ramp load system.

FIG. 10 is a top view of an example of the configuration of a hard disk device of the ramp load system. The main components of this hard disk device is similar to those shown in FIG. 9. The hard disk device of FIG. 10 includes a ramp 39 for having the slider 27 retreating from the disk 36 when the slider 27 is at a standstill. When the slider 27 is at a standstill, the arm 32 of the carriage 31 places the slider 27 outside the perimeter of the disk 36. At this point the suspension 28 is in contact with the ramp 39, and the slider 27 is displaced such that the distance from the surface of the disk 36 increases. When the state shifts from a standstill to action, the arm 32 swings such that the slider 27 moves toward the center of the disk 36. During this movement, the suspension 28 is gradually displaced toward the surface of the disk 36 along the ramp 39. The slider 27 thereby approaches the surface of the disk 36. The movement made when the state shifts from action to a standstill is the reverse of the movement made when the state shifts from a standstill to action.

Figure 1:
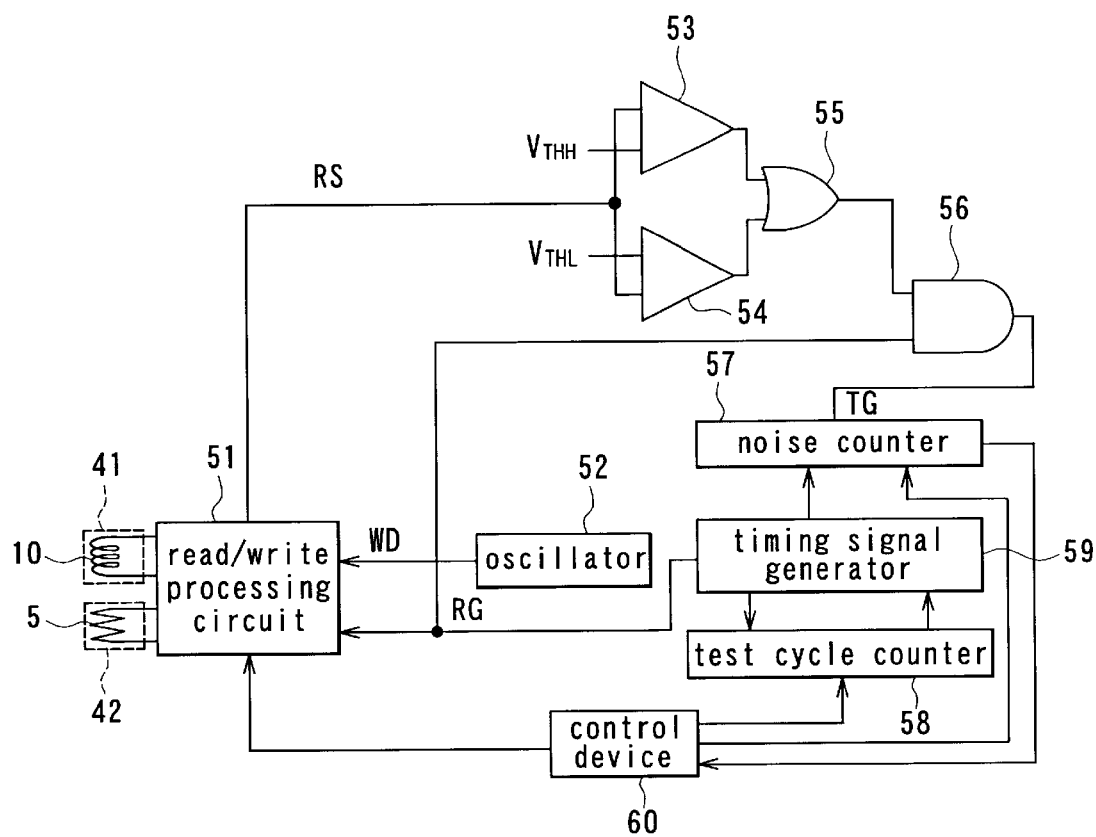
FIG. 1 is a block diagram of a property improving apparatus of an embodiment of the invention.

Reference is now made to FIG. 1 to describe an apparatus for improving the property of a thin-film magnetic head (hereinafter simply called the property improving apparatus) of this embodiment. FIG. 1 is a block diagram of the apparatus. The apparatus comprises a read/write processing circuit 51 for performing processing of reading and writing. The circuit 51 is connected to the thin-film coil 10 of the recording head (induction-type electromagnetic transducer) 41 and to the MR element 5 of the reproducing head 42 of the thin-film magnetic head. The apparatus further comprises: an oscillator 52 for generating a specific item of data to be written WD and sending it to the processing circuit 51; and comparators 53 and 54 each of which receives read signal RS outputted from the circuit 51 through one of the inputs. Upper threshold voltage $V_{THH}$ is inputted to the other of the inputs of the comparator 53. Threshold voltage $V_{THH}$ is used for determining whether any popcorn noise is produced. Lower threshold voltage $V_{THL}$ is inputted to the other of the inputs of the comparator 54. Threshold voltage $V_{THL}$ is used for determining whether any popcorn noise is produced.

The property improving apparatus further comprises: an OR gate 55 for receiving the output of each of the comparators 53 and 54 from each of the inputs; an AND gate 56 for receiving the output of the OR gate 55 from one of the inputs; a noise counter 57 for counting trigger signals TG that are the outputs of the AND gate 56; a test cycle counter 58 for counting the test cycle; a timing signal generator 59 for sending read gate signal RG to the processing circuit 51 and sending a timing signal to the noise counter 57 and the test cycle counter 58; and a control device 60 for controlling the processing circuit 51, the noise counter 57 and the test cycle counter 58. The timing signal generator 59 generates read gate signal RG and a timing signal, referring to the instant when the value of the test cycle counter 58 changes. The control device 60 receives the value of the noise counter 57 and determines whether the number of occurrences of popcorn noise is greater than the permissible value. The control device 60 may be made up of a computer.

In the apparatus shown in FIG. 1, the comparators 53 and 54, the OR gate 55, the AND gate 56, the noise counter 57 and the control device 60 correspond to the determination means of the invention. The read/write processing circuit 51 and the control device 60 correspond to the energizing means of the invention. The control device 60 corresponds to the control means of the invention. The comparators 53 and 54, the OR gate 55, the AND gate 56 and the noise counter 57 correspond to the measuring device of the invention. The read/write processing circuit 51 corresponds to the energizing circuit of the invention. The property improving apparatus shown in FIG. 1 corresponds to the property improving system of the invention.

Figure 2:
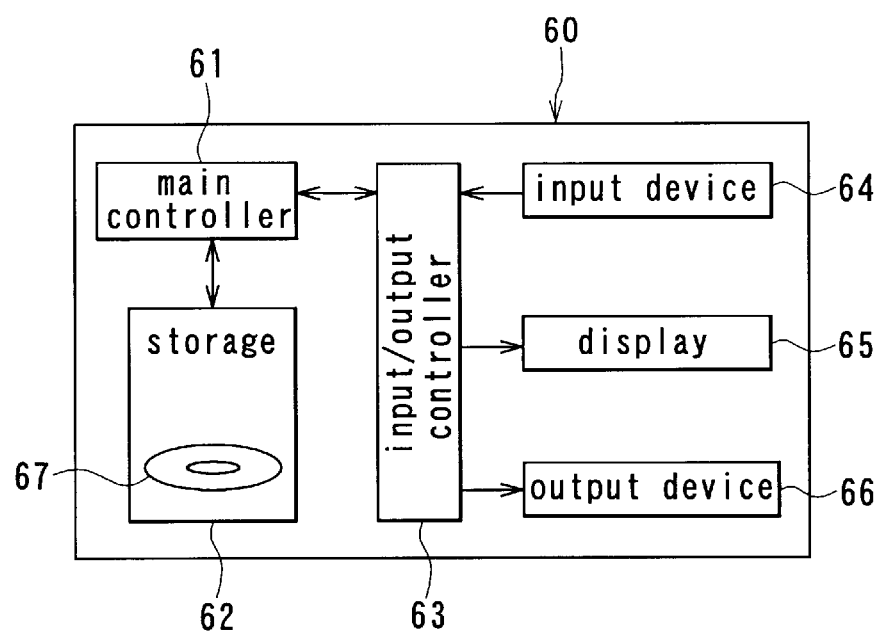
FIG. 2 is a block diagram of an example of the configuration of the control device of FIG. 1.

FIG. 2 is a block diagram of an example of the control device 60. This control device 60 comprises: a main controller 61; a storage 62 connected to the main controller 61; an input/output controller 63 connected to the main controller 61; an input device 64; a display 65; and an output device 66. The input device 64, the display 65 and the output device 66 are connected to the input/output controller 63. The main controller 61 incorporates a central processing unit (CPU), a read only memory (ROM) and a random access memory (RAM). The storage 62 may be of any form as long as it is capable of retaining information, such as a hard disk device, an optical disk device, or a floppy disk device. The storage 62 allows information to be recorded on a recording medium 67 and to be reproduced from the medium 67. The medium 67 may be of any form as long as it is capable of retaining information, such as a hard disk platter, an optical disk, or a floppy disk.

The CPU in the main controller 61 implements the function as the control device 60 by executing programs stored on the medium 67 or in the ROM in the main controller 61, using the RAM in the main controller 61 as a work area.

Figure 12:
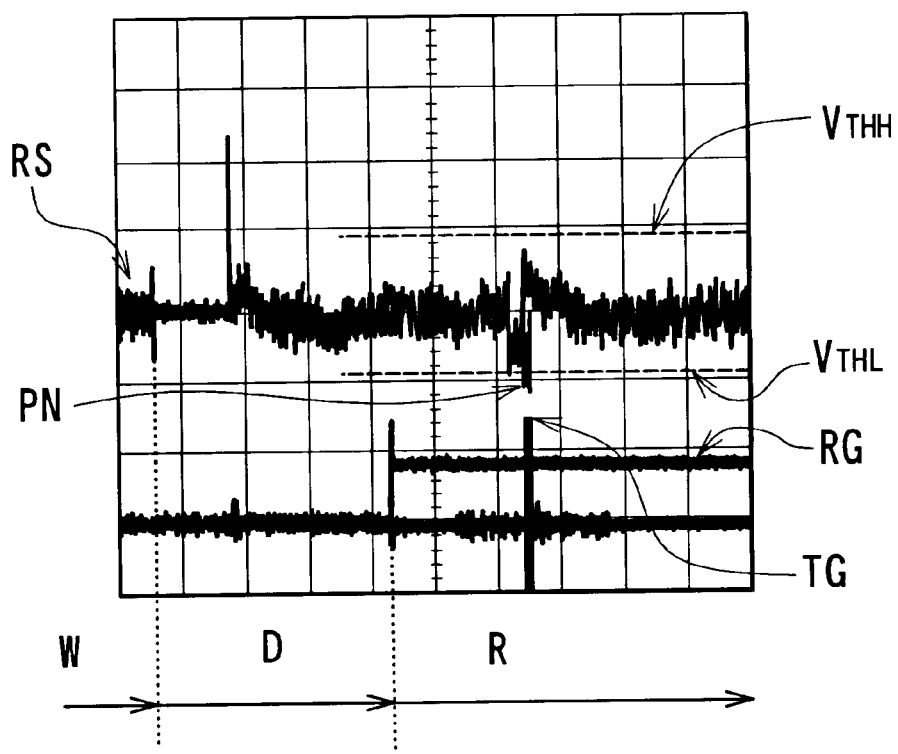
FIG. 12 is a waveform plot for describing the read signal, threshold voltage, popcorn noise, trigger signal and read gate signal of the embodiment of the invention.

Reference is now made to FIG. 12 to describe read signal RS, threshold voltages $V_{THH}$ and $V_{THL}$, popcorn noise, trigger signal TG and read gate signal RG that are mentioned in the foregoing description. In FIG. 12 'W' indicates a writing operation period, 'R' indicates a reading operation period, and 'D' indicates a delay period provided between writing operation period W and reading operation period R. Delay period D is determined such that the reading operation is started after the transient response of the read/write processing circuit 51 ceases when the writing operation shifts to the reading operation. Read gate signal RG is at the high level in reading operation period R and the low level in any other period.

As shown in FIG. 12, if the reading operation is performed after the writing operation, popcorn noise PN may occur in the voltage wave of read signal RS. The popcorn noise is a pulse-shaped noise having a peak value much higher than that of a normal white noise. Threshold voltage $V_{THH}$ is the upper voltage level compared with read signal RS for determining whether any popcorn noise is produced. Threshold voltage $V_{THL}$ is the lower voltage level compared with read signal RS for determining whether any popcorn noise is produced. The output of the comparator 53 of FIG. 1 reaches the high level when read signal RS is greater than threshold voltage $V_{THH}$, and goes to the low level under any other condition. The output of the comparator 54 of FIG. 1 reaches the high level when read signal RS is smaller than threshold voltage $V_{THL}$, and goes to the low level under any other condition. Therefore, if read signal RS goes out of the range whose upper and lower limits are defined by threshold voltages $V_{THH}$ and $V_{THL}$, the output of the OR gate 55 of FIG. 1 goes high. At the same time, if read gate signal RG is at the high level, the output of the AND gate 56 goes high. This output is trigger signal TG.

Figure 13:
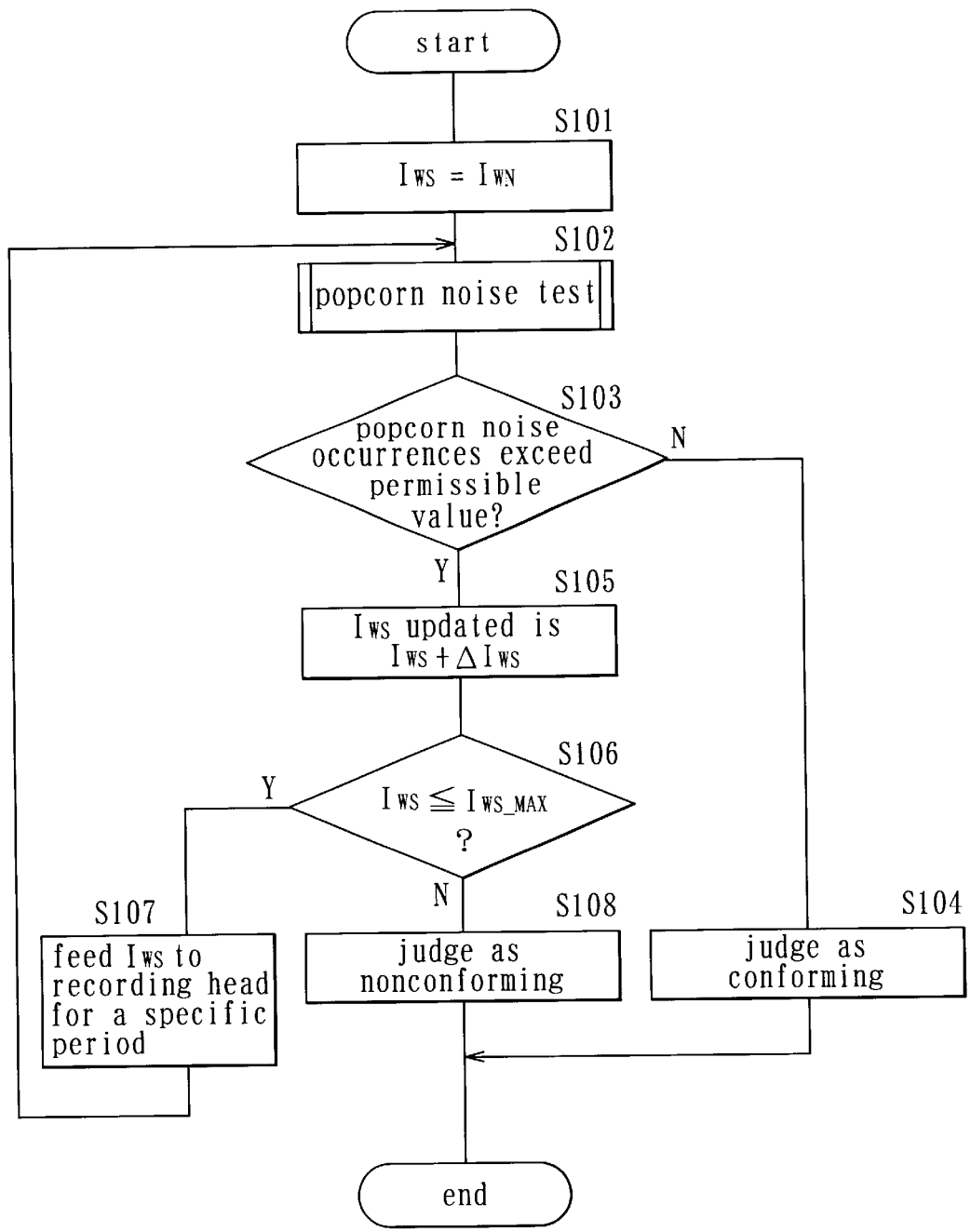
FIG. 13 is a flowchart of the operation of the property improving apparatus of the embodiment.
Figure 14:
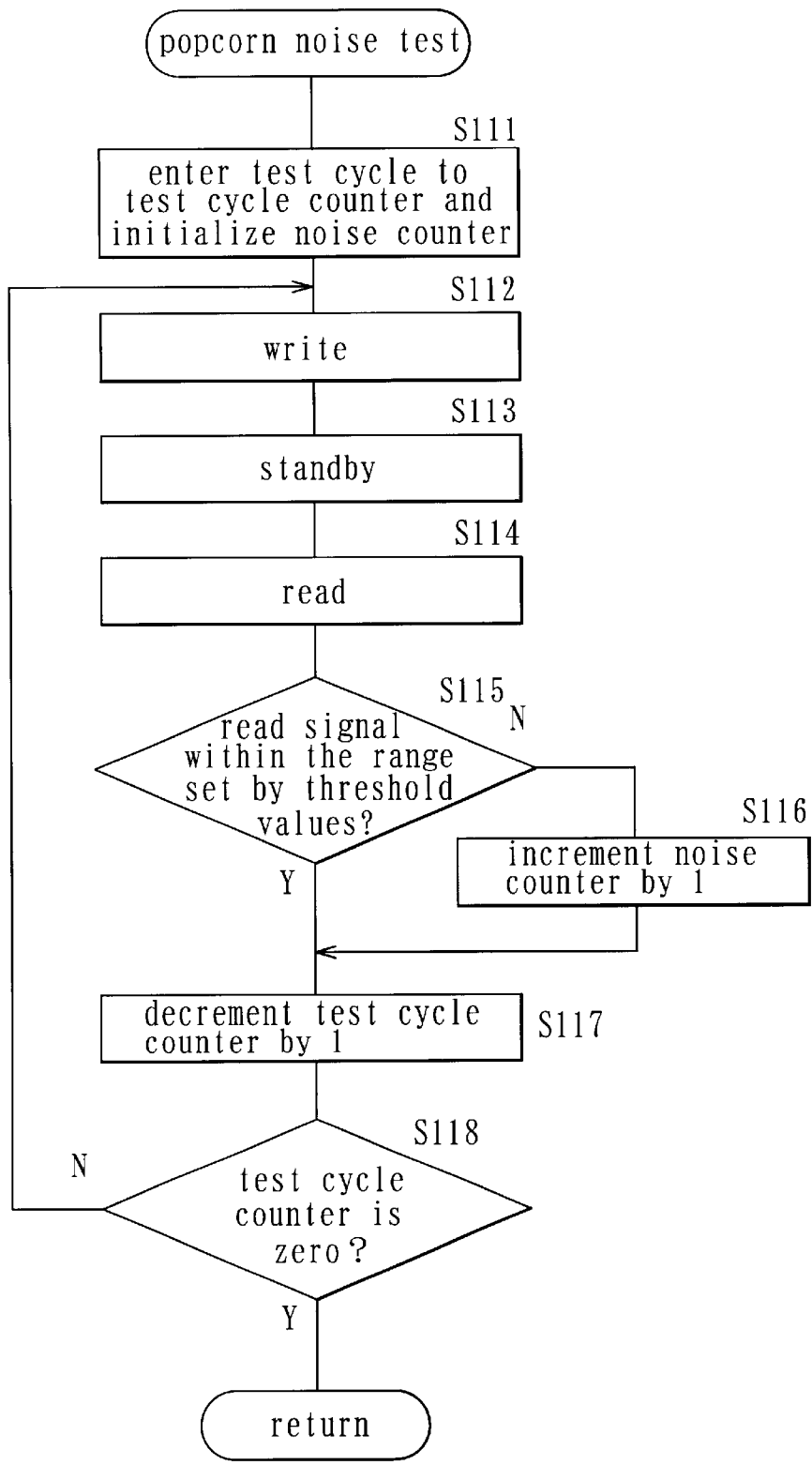
FIG. 14 is a flowchart of the processing of the popcorn noise test of FIG. 13.

Reference is now made to FIG. 13 and FIG. 14 to describe the operation of the property improving apparatus (hereinafter called the property improving processing) of this embodiment, and the method of improving the property of a thin-film magnetic head of this embodiment.

As shown in FIG. 13, the control device 60 of the property improving apparatus makes the value $I_{WS}$ of the write current equal to the value $I_{WN}$ of the write current fed when a normal writing operation is performed (step S101). The value $I_{WS}$ is of the write current fed to the thin-film coil 10 of the recording head (induction-type electromagnetic transducer) 41 of the thin-film magnetic head during energizing processing described later. $I_{WN}$ may be 38 mA$_{0-P}$, for example.

Next, the control device 60 performs a popcorn noise test (step S102). The content of processing of the popcorn test will be described later, referring to FIG. 14. Next, the control device 60 determines whether the number of occurrences of popcorn noise is greater than the permissible value, referring to the value of the noise counter 57 (step S103). The permissible value may be zero. The control device 60 determines that the thin-film magnetic head is a conforming product if the number of occurrences of popcorn noise is not greater than the permissible value (N) (step S104), and terminates the operation.

If the number of occurrences of popcorn noise is greater than the permissible value (Y of step S103), the control device 60 determines that an updated $I_{WS}$ is $I_{WS}+\Delta I_{WS}$ (step S105), wherein $\Delta I_{WS}$ is an increment in $I_{WS}$ of one step when $I_{WS}$ gradually increases. Next, the control device 60 determines whether $I_{WS}$ is equal to or smaller than $I_{WS\_MAX}$ (step S106), wherein $I_{WS\_MAX}$ is the upper limit value of $I_{WS}$ and may be 60 mA$_{0-P}$.

If $I_{WS}$ is equal to or smaller than $I_{WS\_MAX}$ (Y), the control device 60 controls the read/write processing circuit 51 and performs energizing processing, that is, feeding a write current of $I_{WS}$ to the thin-film coil 10 of the recording head 41 for a specific period of time (step S107), and returns to step S102.

If $I_{WS}$ is not equal to or smaller than $I_{WS\_MAX}$ (N), that is, $I_{WS}$ reaches $I_{WS\_MAX}$ in step S106, the control device 60 determines that the thin-film magnetic head is a nonconforming product (step S108), and terminates the operation.

The popcorn noise test of step S102 shown in FIG. 13 corresponds to the first step of the invention. The energizing processing of step S107 corresponds to the second step of the invention.

Reference is now made to FIG. 14 to describe the content of processing of the popcorn noise test of step S102 shown in FIG. 13.

In the popcorn noise test, the control device 60 enters the test cycles to the test cycle counter 58 and initializes the noise counter 57 (step S111). The test cycles may be 500, for example. Next, the control device 60 controls the read/write processing circuit 51 and allows the recording head 41 to perform a writing operation (step S112). The period of time required for this writing operation may be tens to hundreds of microseconds. The write current used for the writing operation is of the value of $I_{WN}$ of the write current fed when a normal writing operation is performed. The write current used for the writing operation is an alternating current modulated by data WD to be written outputted from the oscillator 52, and the frequency thereof may be 60 MHz, for example.

Next, the control device 60 is on standby for delay period D (step S113). Delay period D may be a few microseconds.

Next, the control device 60 controls the read/write processing circuit 51 and allows the reproducing head 42 to perform a reading operation (step S114). The period of time required for this reading operation may be tens of microseconds. Read signal RS outputted from the processing circuit 51 is inputted to the comparators 53 and 54 wherein whether signal RS falls within the range defined by threshold voltages $V_{THH}$ and $V_{THL}$ (step S115) is determined. If signal RS is not within the range (N), the AND gate 56 outputs trigger signal TG so that the value of the noise counter 57 thereby increases by 1 (step S116). If signal RS is within the range (Y of step S115), the value of the noise counter 57 remains the same.

Next, the value of the test cycle counter 58 decreases by 1 in accordance with the timing signal outputted from the timing signal generator 59 (step S117). Whether the value of the test cycle counter 58 is zero is then determined (step S118). If it is not zero (N), the operation returns to step S112. If it is zero (Y), the operation returns to the procedure shown in FIG. 13.

As thus described, the method of improving the property of the thin-film magnetic head of this embodiment includes the first and second steps. In the first step the popcorn noise in read signal RS of the thin-film magnetic head is measured and whether the noise is within the permissible range is determined. In the second step a current whose value is greater than the current used for a normal writing operation is fed. While the value of the current fed to the recording head 41 is gradually increased in the second step, the first and second steps are alternately repeated until the popcorn noise is judged to be within the permissible range in the first step, or the current value reaches a specific upper limit.

According to this embodiment, a program for executing each of the above-mentioned steps by a computer may be stored on the medium 67 of FIG. 2, so that the computer (the control device 60) performs those steps as a computer process, according to the program.

According to the method and apparatus for improving the property of the thin-film magnetic head of this embodiment, a current whose value is greater than the current used for a normal writing operation is fed to the recording head 41 of the thin-film magnetic head that produces a popcorn noise beyond the permissible range, until the popcorn noise is judged to be within the permissible range, or the current value reaches the upper limit. Consequently, the properties of many of thin-film magnetic heads that produce popcorn noise beyond the permissible range are improved so that the popcorn noise falls within the permissible range. As a result, many of the heads turn out to be conforming products.

Although the exact reason the popcorn noise is reduced by feeding a current greater than the current fed for a normal writing operation is not clear, it is assumed that the thin-film coil 10 is heated by energizing and the temperature of the recording head 41 increases, and the stress of the bottom pole layer 8 is thereby released.

Figure 11:
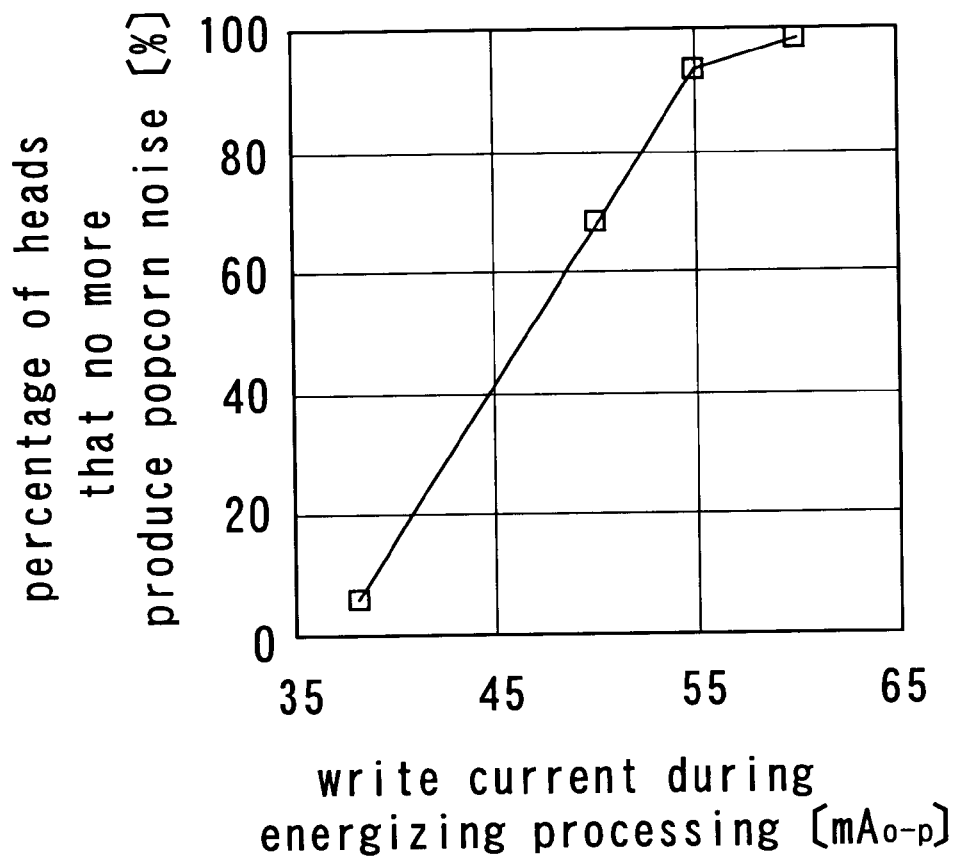
FIG. 11 is a plot for showing an example of the relationship between the write current used for the energizing processing and the percentage of heads that no more produce any popcorn noise.

FIG. 11 is a plot for showing an example of the relationship between the write current used for the energizing processing and the percentage of thin-film magnetic heads that no more produce any popcorn noise. The condition for the popcorn noise test of this example is as follows. The frequency of the write current is 60 MHz. The write current used for the test is 38 $mA_{0-P}$. The duration of the writing operation is 400 microseconds. The delay period is 3 microseconds. The duration of the reading operation is 20 microseconds. Threshold voltage $V_{THH}$ is 175 microvolts. Threshold voltage $V_{THL}$ is -175 microvolts. The test cycles are 500.

As shown in FIG. 11, as the write current used for energizing increases, the percentage of heads that do not produce any popcorn noise increases. When the current value reaches 60 $mA_{0-P}$, the percentage is nearly 100 percent. Although the write current used for energizing is 60 $mA_{0-P}$, there is no reduction in other properties of the thin-film magnetic heads.

Figure 15:
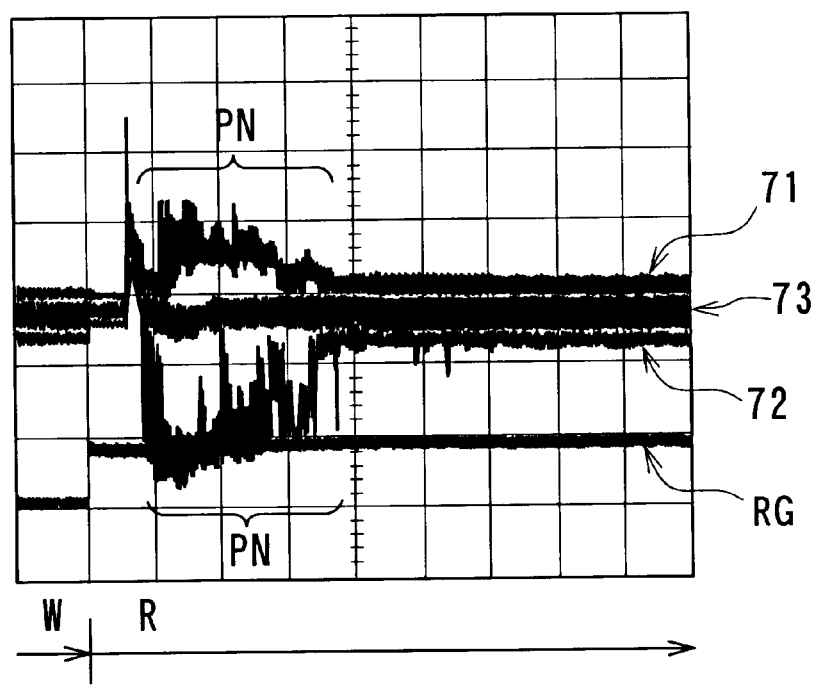
FIG. 15 is a waveform plot of the read signal before the property improving processing of the embodiment is performed.
Figure 16:
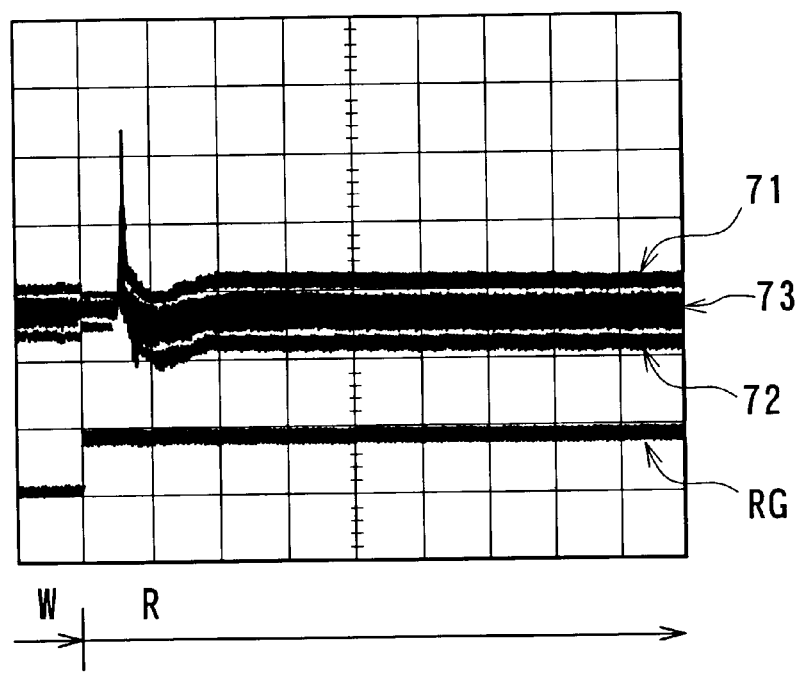
FIG. 16 is a waveform plot of the read signal after the property improving processing of the embodiment is performed.

Reference is now made to FIG. 15 and FIG. 16 to describe variations in the wave of the read signal before and after the property improving processing of this embodiment is performed. FIG. 15 illustrates the wave of the read signal before the property improving processing is performed. FIG. 16 illustrates the wave of the read signal after the property improving processing is performed. FIG. 15 and FIG. 16 show: the maximum value 71 and the minimum value 72 of the read signal obtained in each period when 500 cycles of the writing operation and the reading operation are performed; a read signal 73 in the final cycle; and read gate signal RG. In FIG. 15 and FIG. 16 'W' indicates the writing operation period, and 'R' indicates the reading operation period. As shown in FIG. 15, popcorn noise PN occurs in the read signal obtained before the property improving processing is performed, while no popcorn noise PN is found in the read signal obtained after the improving processing is performed.

In this embodiment it is preferred that the thin-film magnetic head is not facing toward a recording medium when the energizing processing is performed, that is, feeding a write current to the recording head 41, the write current having a value greater than that of the current fed when a normal writing operation is performed. This is because the temperature of the recording head becomes higher with the same write current when energizing is performed while the head is not facing toward the medium, compared to the case in which energizing is performed while the head is facing toward the medium. It is thereby possible to reduce the popcorn noise more effectively or to reduce the value of the write current fed to the recording head 41 for the energizing processing.

The method of improving the property of the thin-film magnetic head of the embodiment may be performed on any of the following states: the wafer in which a plurality of rows of thin-film magnetic heads are aligned (as the wafer 21 shown in FIG. 4); a row of a plurality of thin-film magnetic heads (as the bar 22 shown in FIG. 5); a single thin-film magnetic head (as the slider 27 shown in FIG. 6); the head mounted on the suspension (as the head gimbal assembly 30 shown in FIG. 7); a plurality of thin-film magnetic heads each of which is mounted on the carriage through the suspension (as the head stack assembly 34 shown in FIG. 8); and the head incorporated in the magnetic disk device (as the hard disk device shown in FIG. 9). It is possible to perform the energizing processing while the thin-film magnetic head is not facing toward the recording medium in any of those states except the state in which the head is incorporated in the magnetic disk device. Even if the head is incorporated in the magnetic disk device, it is possible to perform the energizing processing while the head is not facing toward the recording medium if the ramp load system as shown in FIG. 10 is employed.

According to the embodiment thus described, it is possible to reduce the popcorn noise of the thin-film magnetic heads, so that nonconforming products are reduced. It is therefore unnecessary to discard products with high added values.

The present invention is not limited to the foregoing embodiment but may be practiced in still other ways. For example, the invention is not limited to the case in which the current fed to the recording head is gradually increased as in the foregoing embodiment, but includes the case in which a current of a constant value is fed to the recording head, the value being greater than that of a current fed when a normal writing operation is performed.

The invention is not limited to the composite thin-film magnetic head, as the head of the foregoing embodiment, in which the pole layer of the recording head also functions as the shield layer of the reproducing head, but may be applied to the composite thin-film magnetic head in which the recording head is magnetically isolated from the reproducing head. The invention may be applied to the thin-film magnetic head that performs reading and writing by the induction-type electromagnetic transducer.

According to the first method of improving the property of the thin-film magnetic head of the invention thus described, a current is fed to the induction-type electromagnetic transducer, the current having a value greater than the value of the current fed when a normal writing operation is performed. As a result, the temperature of the transducer increases, and the noise made in the read signal after the writing operation is completed is thereby reduced. It is thereby possible to reduce nonconforming products.

According to the first method of the invention, the current may be fed while the head is not facing toward a recording medium. It is thereby possible to reduce the noise more effectively or to reduce the value of the current fed.

According to the second method of improving the property of the thin-film magnetic head of the invention, a current is fed to the electromagnetic transducer of the thin-film magnetic head producing noise beyond the permissible range, the current having a value greater than the value of the current fed when the normal writing operation is performed, until it is determined that the noise falls within the permissible range, or the current value reaches a specific upper limit. As a result, the noise made in the read signal after the writing operation is completed is thereby reduced. It is thereby possible to reduce nonconforming products.

According to the second method of the invention, the current may be fed while the head is not facing toward a recording medium. It is thereby possible to reduce the noise more effectively or to reduce the value of the current fed.

According to the first or second apparatus, the system, the computer process, or the recording medium on which the program is stored of the invention for improving the property of the thin-film magnetic head, a current is fed to the electromagnetic transducer of the thin-film magnetic head producing noise beyond the permissible range, the current having a value greater than the value of the current fed when the normal writing operation is performed, until it is determined that the noise falls within the permissible range, or the current value reaches a specific upper limit. As a result, the noise made in the read signal after the writing operation is completed is thereby reduced. It is thereby possible to reduce nonconforming products.

Obviously many modifications and variations of the present invention are possible in the light of the above teachings. It is therefore to be understood that within the scope of the appended claims the invention may be practiced otherwise than as specifically described.

What is claimed is:

1. A method of improving a property of a thin-film magnetic head by reducing noise made in a read signal after a writing operation is completed, the head incorporating at least an induction-type electromagnetic transducer and performing reading and writing, wherein
   a current is fed to the transducer, the current having a value greater than a value of a current fed when a normal writing operation is performed, and the current is fed while the head is not facing toward a recording medium.

2. A method of improving a property of a thin-film magnetic head by reducing noise made in a read signal after a writing operation is completed, the head incorporating at least an induction-type electromagnetic transducer and performing reading and writing, the method including:
   a first step of measuring the noise in the read signal of the head and determining whether the noise falls within a permissible range; and
   a second step of feeding a current to the transducer, the current having a value greater than a value of a current fed when a normal writing operation is performed; wherein,
   while the value of the current fed to the transducer is gradually increased in the second step, the first and second steps are alternately repeated until it is determined that the noise falls within the permissible range in the first step, or the current value reaches a specific upper limit.

3. The method according to claim 2 wherein the second step is performed while the head is not facing toward a recording medium.

4. The method according to claim 2 wherein the first and second steps are performed when the head is in any of states of a wafer in which a plurality of rows of thin-film magnetic heads are aligned; a row of a plurality of thin-film magnetic heads; the single thin-film magnetic head; the head mounted on a suspension; a plurality of thin-film magnetic heads each of which is mounted on a carriage through a suspension; and the head incorporated in a magnetic disk device.

5. An apparatus for improving a property of a thin-film magnetic head by reducing noise made in a read signal after a writing operation is completed, the head incorporating at least an induction-type electromagnetic transducer and performing reading and writing, the apparatus comprising:
   a determination means for measuring the noise in the read signal of the head and determining whether the noise falls within a permissible range;
   an energizing means for feeding a current to the transducer, the current having a value greater than a value of a current fed when a normal writing operation is performed; and
   a control means for controlling the determination means and the energizing means such that, while the value of the current fed to the transducer is gradually increased, the determination and the energizing are alternately repeated until the determination means determines that the noise falls within the permissible range, or the current value reaches a specific upper limit.

6. An apparatus for improving a property of a thin-film magnetic head by reducing noise made in a read signal after a writing operation is completed, the head incorporating at least an induction-type electromagnetic transducer and performing reading and writing, the apparatus comprising:
   a measuring device for measuring the noise in the read signal of the head;
   an energizing circuit for feeding a current to the transducer, the current having a value greater than a value of a current fed when a normal writing operation is performed; and
   a control device for determining whether the noise measured by the measuring device falls within a permissible range and for controlling the measuring device and the energizing circuit such that, while the value of the current fed from the energizing circuit to the transducer is gradually increased, the measurement and the energizing are alternately repeated until it is determined that the noise falls within the permissible range, or the current value reaches a specific upper limit.

7. A system for improving a property of a thin-film magnetic head by reducing noise made in a read signal after a writing operation is completed, the head incorporating at least an induction-type electromagnetic transducer and performing reading and writing, the system comprising:
   a processing circuit for performing processing concerning the reading and writing performed by the head and for outputting the read signal;
   a measuring device for measuring the noise in the read signal outputted from the processing circuit; and a control device for controlling the processing circuit and the measuring device; wherein:

the processing circuit feeds a current to the transducer in accordance with the control performed by the control device, the current having a value greater than a value of a current fed when a normal writing operation is performed; and the control device determines whether the noise measured by the measuring device falls within a permissible range, and controls the measuring device and the processing circuit such that, while the value of the current fed from the processing circuit to the transducer is gradually increased, the measurement and the feeding are alternately repeated until it is determined that the noise falls within the permissible range, or the current value reaches a specific upper limit.

8. A computer process for improving a property of a thin-film magnetic head by reducing noise made in a read signal after a writing operation is completed, the head incorporating at least an induction-type electromagnetic transducer and performing reading and writing, the process being provided for a system comprising: a processing circuit for performing processing concerning the reading and writing performed by the head and for outputting the read signal; a measuring device for measuring the noise in the read signal outputted from the processing circuit; and a computer for controlling the measuring device and the processing circuit; the process including the following steps executed by the computer:

the first step of determining whether the noise measured by the measuring device falls within a permissible range; and the second step of controlling the processing circuit such that a current is fed to the transducer, the current having a value greater than a value of a current fed when a normal writing operation is performed; wherein, while the value of the current fed to the transducer is gradually increased in the second step, the first and second steps are alternately repeated until it is determined that the noise falls within the permissible range in the first step, or the current value reaches a specific upper limit.

9. A system including a recording medium on which a program is stored, the program being provided for improving a property of a thin-film magnetic head by reducing noise made in a read signal after a writing operation is completed, the head incorporating at least an induction-type electromagnetic transducer and performing reading and writing, the system comprising:

a processing circuit for performing processing concerning the reading and writing performed by the head and for outputting the read signal;

a measuring device for measuring the noise in the read signal outputted from the processing circuit;

a computer for controlling the measuring device and the processing circuit; and the program in the recording medium which when executed by the computer causes the computer to:

in the first step, determine whether the noise measured by the measuring device falls within a permissible range; and in the second step, control the processing circuit such that a current is fed to the transducer, the current having a value greater than a value of a current fed when a normal writing operation is performed; wherein, while the value of the current fed to the transducer is gradually increased in the second step, the first and second steps are alternately repeated until it is determined that the noise falls within the permissible range in the first step, or the current value reaches a specific upper limit.

* * * * *